(12) United States Patent
Ose et al.

(10) Patent No.: US 9,525,192 B2
(45) Date of Patent: Dec. 20, 2016

(54) ALL SOLID STATE BATTERY

(75) Inventors: Norihiro Ose, Sunto-gun (JP); Hiroshi Nagase, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 14/414,976

(22) PCT Filed: Jul. 24, 2012

(86) PCT No.: PCT/JP2012/068711
§ 371 (c)(1),
(2), (4) Date: Jan. 15, 2015

(87) PCT Pub. No.: WO2014/016907
PCT Pub. Date: Jan. 30, 2014

(65) Prior Publication Data
US 2015/0207177 A1    Jul. 23, 2015

(51) Int. Cl.
*H01M 4/13* (2010.01)
*H01M 4/60* (2006.01)
*H01M 10/0562* (2010.01)
*H01M 6/18* (2006.01)
*H01M 10/0585* (2010.01)
*H01M 4/133* (2010.01)
*H01M 4/583* (2010.01)
(Continued)

(52) U.S. Cl.
CPC ......... *H01M 10/0585* (2013.01); *H01M 4/043* (2013.01); *H01M 4/133* (2013.01); *H01M 4/583* (2013.01); *H01M 4/62* (2013.01); *H01M 10/052* (2013.01); *H01M 10/054* (2013.01); *H01M 10/0562* (2013.01); *H01M 4/587* (2013.01); *H01M 2004/021* (2013.01); *H01M 2300/0068* (2013.01); *Y02E 60/122* (2013.01); *Y02T 10/7011* (2013.01)

(58) Field of Classification Search
CPC ...... H01M 6/185; H01M 4/133; H01M 4/136; H01M 6/187; H01M 2300/0065
See application file for complete search history.

(56) References Cited

U.S. PATENT DOCUMENTS

| | | |
|---|---|---|
| 2004/0023115 A1 | 2/2004 | Kato et al. |
| 2007/0111101 A1 | 5/2007 | Ohkubo et al. |
| 2016/0261002 A1* | 9/2016 | Trevey .................. H01M 4/131 |

FOREIGN PATENT DOCUMENTS

| | | |
|---|---|---|
| JP | 2004-127913 A | 4/2004 |
| JP | 2005-340152 A | 12/2005 |

(Continued)

*Primary Examiner* — Patrick Ryan
*Assistant Examiner* — Julian Anthony
(74) *Attorney, Agent, or Firm* — Oliff PLC (57) ABSTRACT

The main object of the present invention is to provide an all solid state battery suitable for high rate charging. The present invention solves the problem by providing an all solid state battery including a battery element having a cathode active material layer, an anode active material layer, and a solid electrolyte layer formed between the cathode active material layer and the anode active material layer, characterized in that the anode active material layer contains graphite as an anode active material and a sulfide solid electrolyte, the graphite has a hardness of 0.36 GPa or more by a nanoindentation method, and the battery element is confined at a pressure more than 75 kgf/cm$^2$.

1 Claim, 2 Drawing Sheets

(51) Int. Cl.
*H01M 4/04* (2006.01)
*H01M 4/62* (2006.01)
*H01M 10/052* (2010.01)
*H01M 10/054* (2010.01)
H01M 4/587 (2010.01)
H01M 4/02 (2006.01)

(56) References Cited

FOREIGN PATENT DOCUMENTS

| JP | 2008-166047 A | 7/2008 |
| JP | 2009-176494 A | 8/2009 |
| JP | 2009-176541 A | 8/2009 |
| JP | 2012-048853 A | 3/2012 |

* cited by examiner

ALL SOLID STATE BATTERY

TECHNICAL FIELD

The present invention relates to an all solid state battery suitable for high rate charging.

BACKGROUND ART

For example, a lithium battery has been widely put to practical use in the field of information relevant apparatuses and communication apparatuses by reason of having a high electromotive force and a high energy density. On the other hand, the development of an electric automobile and a hybrid automobile has been hastened also in the field of automobiles from the viewpoint of environmental issues and resource problems, and a lithium battery has been studied also as a power source thereof.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. In contrast, an all solid lithium battery all-solidified by replacing the liquid electrolyte with a solid electrolyte layer is conceived to intend the simplification of the safety device and be excellent in production cost and productivity for the reason that the flammable organic solvent is not used in the battery.

Such an all solid state battery generally has a cathode active material layer, an anode active material layer, and a solid electrolyte layer formed between the cathode active material layer and the anode active material layer. For example, in Patent Literature 1, an all solid state battery having a solid electrolyte layer with a film thickness of 10 μm to 300 μm and a voidage of 30% or less, containing a sulfide solid electrolyte, is disclosed. Also, pressurizing at a pressure of 30 MPa to 1000 MPa (306 kgf/cm$^2$ to 10200 kgf/cm$^2$) is disclosed as a method for making a voidage of the electrolyte layer into 30% or less.

CITATION LIST

Patent Literature

Patent Literature 1: Japanese Patent Application Publication (JP-A) No. 2009-176541

SUMMARY OF INVENTION

Technical Problem

The improvement of charging characteristics at high rate is claimed for an all solid state battery. It is conceived to be necessary to control the next four factors for input characteristics in high rate charging. That is to say, it is conceived to be necessary to control confining pressure of a battery element, voidage of an anode active material layer, orientation property of an anode active material layer, and hardness of an anode active material. However, in Patent Literature 1, the problem is that the control of the four factors described above is so insufficient that input characteristics in high rate charging deteriorate. The present invention has been made in view of the actual circumstances, and the main object thereof is to provide an all solid state battery suitable for high rate charging.

Solution to Problem

In order to achieve the above-described object, in the present invention, there is provided an all solid state battery comprising a battery element having a cathode active material layer, an anode active material layer, and a solid electrolyte layer formed between the cathode active material layer and the anode active material layer, characterized in that the anode active material layer contains graphite as an anode active material and a sulfide solid electrolyte, the graphite has a hardness of 0.36 GPa or more by a nanoindentation method, and the battery element is confined at a pressure more than 75 kgf/cm$^2$.

According to the present invention, the graphite as an anode active material has a predetermined hardness and the battery element is confined at a predetermined pressure (confining pressure), so that input characteristics during high rate charging improve. Thus, an all solid state battery suitable for high rate charging may be obtained.

Further, in the present invention, there is provided an all solid state battery comprising a battery element having a cathode active material layer, an anode active material layer, and a solid electrolyte layer formed between the cathode active material layer and the anode active material layer, characterized in that the anode active material layer contains graphite as an anode active material and a sulfide solid electrolyte, the graphite has an $I_{002}/I_{110}$ value of 200 or less after pressing at a pressure of 4.3 ton/cm$^2$ in the case of regarding X-ray diffraction intensity of a peak on (002) plane as $I_{002}$ and X-ray diffraction intensity of a peak on (110) plane as $I_{110}$, and the battery element is confined at a pressure more than 75 kgf/cm$^2$.

According to the present invention, the $I_{002}/I_{110}$ value is within a predetermined range and the battery element is pressured at a predetermined pressure (confining pressure), so that input characteristics during high rate charging improve. Thus, an all solid state battery suitable for high rate charging may be obtained.

Further, in the present invention, there is provided an all solid state battery comprising a battery element having a cathode active material layer, an anode active material layer, and a solid electrolyte layer formed between the cathode active material layer and the anode active material layer, characterized in that the anode active material layer contains graphite as an anode active material and a sulfide solid electrolyte, the graphite has a hardness of 0.36 GPa or more by a nanoindentation method, and a voidage of the anode active material layer is 30% or less.

According to the present invention, the graphite as an anode active material has a predetermined hardness and the voidage of the anode active material layer is within a predetermined range, so that input characteristics during high rate charging improve. Thus, an all solid state battery suitable for high rate charging may be obtained.

Further, in the present invention, there is provided an all solid state battery comprising a battery element having a cathode active material layer, an anode active material layer, and a solid electrolyte layer formed between the cathode active material layer and the anode active material layer, characterized in that the anode active material layer contains graphite as an anode active material and a sulfide solid electrolyte, the graphite has an $I_{002}/I_{110}$ value of 200 or less after pressing at a pressure of 4.3 ton/cm$^2$ in the case of regarding X-ray diffraction intensity of a peak on (002) plane as $I_{002}$ and X-ray diffraction intensity of a peak on (110) plane as $I_{110}$, and a voidage of the anode active material layer is 30% or less.

According to the present invention, the $I_{002}/I_{110}$ value is within a predetermined range and the voidage of the anode active material layer is within a predetermined range, so that input characteristics during high rate charging improve. Thus, an all solid state battery suitable for high rate charging may be obtained.

Advantageous Effects of Invention

The present invention produces the effect such as to allow an all solid state battery suitable for high rate charging.

DESCRIPTION OF EMBODIMENTS

An all solid state battery of the present invention may be roughly divided into four embodiments.

Each of the embodiments is hereinafter described.

1. First Embodiment

The all solid state battery of a first embodiment is an all solid state battery comprising a battery element having a cathode active material layer, an anode active material layer, and a solid electrolyte layer formed between the cathode active material layer and the anode active material layer, characterized in that the anode active material layer contains graphite as an anode active material and a sulfide solid electrolyte, the graphite has a hardness of 0.36 GPa or more by a nanoindentation method, and the battery element is confined at a pressure more than 75 kgf/cm².

Figure 1:
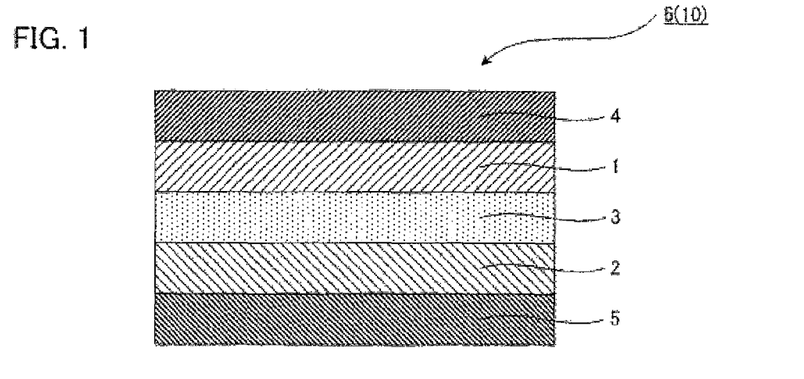
FIG. 1 is a schematic cross-sectional view showing an example of an all solid state battery of the present invention.

FIG. 1 is a schematic cross-sectional view showing an example of the all solid state battery of the first embodiment. An all solid state battery 10 in FIG. 1 comprises a battery element 6 having a cathode active material layer 1, an anode active material layer 2, and a solid electrolyte layer 3 formed between the cathode active material layer 1 and the anode active material layer 2. The battery element 6 further has a cathode current collector 4 formed on the surface of the cathode active material layer 1 opposite to the solid electrolyte layer 2, and an anode current collector 5 formed on the surface of the anode active material layer 2 opposite to the solid electrolyte layer 3.

Figure 2:
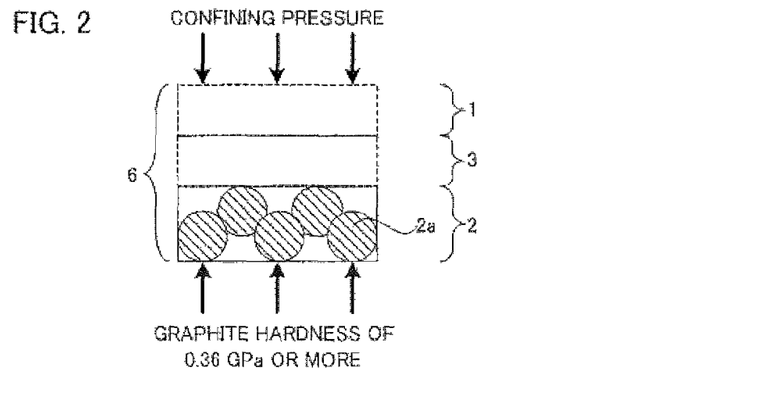
FIG. 2 is a schematic view explaining an example of an anode active material layer in the present invention.

FIG. 2 is a schematic view showing an example of an anode active material layer included in the all solid state battery in the embodiment. As shown in FIG. 2, the anode active material layer 2 contains graphite 2a as an anode active material and a sulfide solid electrolyte (not shown in the figure). With regard to the graphite 2a, a hardness calculated by a nanoindentation method is 0.36 GPa or more. Also, the battery element 6 is confined at a pressure (confining pressure) more than 75 kgf/cm².

According to the embodiment, the anode active material layer has the graphite, in which hardness by a nanoindentation method is a predetermined value or more, as an anode active material and the battery element is confined at a predetermined pressure (confining pressure), so that input characteristics during high rate charging improve. Thus, an all solid state battery suitable for high rate charging may be obtained.

Figure 3:
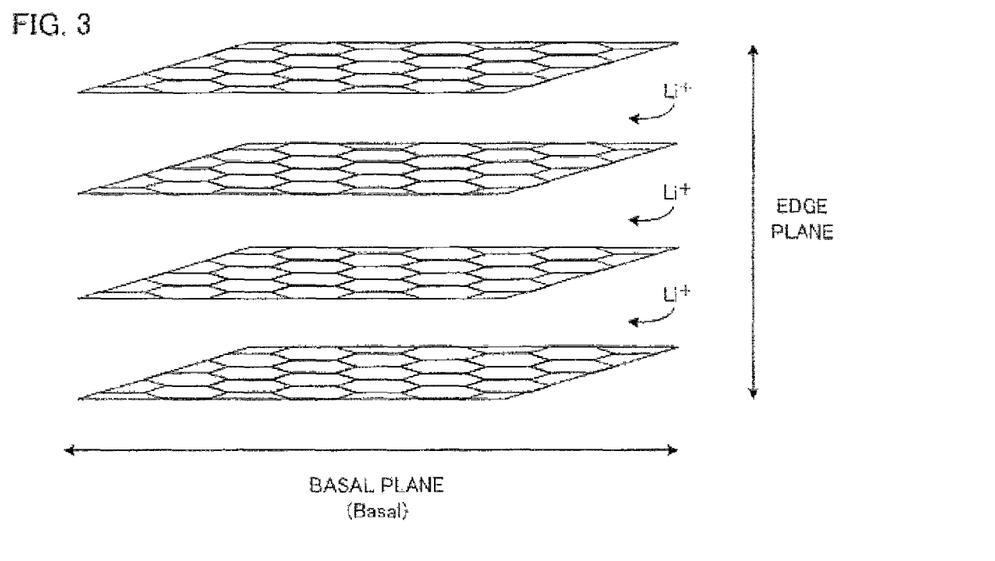
FIG. 3 is a schematic cross-sectional view showing an example of a layer structure of graphite.

Thus, the reason why the graphite has a predetermined hardness and the battery element is confined at confining pressure of a predetermined value and thereby input characteristics during high rate charging improve is guessed as follows. In the case where the graphite as an anode active material does not have a predetermined hardness, it is conceived that the battery element is confined at such a predetermined confining pressure that the shape of the graphite changes and a function as the active material deteriorates. Here, FIG. 3 is a schematic view showing an example of a layer structure of the graphite. As shown in FIG. 3, the graphite has a layer structure, and an edge plane on which a conductive ion (such as Li ion) is inserted and desorbed and a basal plane on which it is not inserted and desorbed exist on the surface of the graphite. Also, the ratio between the two planes on the surface of the graphite changes in accordance with shape change of the graphite. In the graphite not having a predetermined hardness, it is conceived that the shape of the graphite may not sufficiently be retained due to confining pressure of the battery element, the ratio of the edge plane existing on the surface of the graphite decreases relatively, and the ratio of the basal plane increases relatively. Accordingly, it is conceived that an ion conduction path and an electron conduction path are not secured, and a function of the graphite as the active material deteriorates. In contrast, in the embodiment, the graphite has such a predetermined hardness that the shape of the graphite may be retained even though the battery element is confined at a predetermined confining pressure. Thus, it is conceived that the ratio of the edge plane existing on the surface of the graphite is maintained and an ion conduction path is secured. Accordingly, a function of the graphite as the active material is maintained. Also, in the embodiment, it is conceived that the battery element is confined at such a predetermined confining pressure that a sulfide solid electrolyte is crushed so moderately as to easily enter a gap in the graphite. Thus, an anode active material layer more excellent in ion conductivity may be obtained. Accordingly, input characteristics during high rate charging improve and an all solid state battery suitable for high rate charging may be obtained.

The all solid state battery of the embodiment is hereinafter described in each constitution.

(1) Anode Active Material Layer

The anode active material layer in the embodiment is a layer containing graphite as an anode active material and a sulfide solid electrolyte.

(i) Anode Active Material

With regard to the graphite as an anode active material in the embodiment, a hardness by a nanoindentation method (an indentation method) is ordinarily 0.36 GPa or more, preferably 0.40 GPa or more. The reason therefor is that the case where the hardness of the graphite is less than the range brings a possibility that the battery element is confined at such a predetermined confining pressure that the shape of the graphite may not be retained. That is to say, the ratio of the edge plane existing on the surface of the graphite decreases relatively and the ratio of the basal plane increases relatively, so that an ion conduction path and an electron conduction path are not secured and a function of the graphite as the active material deteriorates. Also, the hardness of the graphite is, for example, preferably 10 GPa or less, more preferably 5 GPa or less, particularly preferably 3 GPa or less. Here, the nanoindentation method is a method such that an indenter (such as a needle of a nano-order) is pushed into a material surface to measure hardness and Young's modulus in a micro area from load and displacement magnitude, which method has the advantage that dispersion of numerical values may be lessened to measure numerical values with favorable precision. Specifically, the graphite as an anode active material was embedded in resin and ground to measure the hardness of the graphite on a surface thereof twenty times by using a nanoindenter (manufactured by Agilent Technologies). The obtained numerical values may be averaged to calculate the hardness.

Also, the graphite is not particularly limited if the graphite is such as to have the hardness described above, but is preferably such that the relative ratio of the edge plane existing on the surface of the graphite is a predetermined value or more. Such a relative ratio of the edge plane existing on the surface of the graphite is measured in the following manner. That is to say, the ratio is measured from an $I_{002}/I_{110}$ value after pressing at a pressure of 4.3 ton/cm² in the case of regarding X-ray diffraction intensity of a peak on (002) plane of the graphite as $I_{002}$ and X-ray diffraction intensity of a peak on (110) plane of the graphite as $I_{110}$. Here, (002) plane of the graphite corresponds to a basal plane and (110) plane corresponds to an edge plane. Thus, in the embodiment, from the viewpoint of insertion and desorption of a conductive ion, the $I_{002}/I_{110}$ value as diffraction intensity ratio is preferably smaller, for example, preferably the same range (specifically 200 or less) as the second embodiment and fourth embodiment described later. Incidentally, a calculation method for the diffraction intensity ratio is described later.

The graphite is not particularly limited if the graphite is such as to have the hardness described above, but may be artificial graphite or natural graphite; among them, artificial graphite may be appropriately used.

Examples of the shape of the graphite as an anode active material include a particulate shape and a filmy shape. Also, the average particle diameter of the graphite is preferably, for example, within a range of 0.1 µm to 50 µm, above all, within a range of 1 µm to 50 µm, and within a range of 1 µm to 20 µm, further, within a range of 5 µm to 15 µm. Incidentally, the average particle diameter may be measured with observation by a scanning electron microscope (SEM), for example. Also, the content of the anode active material in the anode active material layer is, for example, preferably within a range of 10% by weight to 99% by weight, more preferably within a range of 20% by weight to 90% by weight.

(ii) Sulfide Solid Electrolyte

The sulfide solid electrolyte material in the embodiment is not particularly limited if the sulfide solid electrolyte material is such as to contain sulfur and have ion conductivity. The sulfide solid electrolyte has a soft and fragile property as compared with an oxide based solid electrolyte, for example. Thus, the application of confining pressure to the battery element allows the sulfide solid electrolyte to easily change (crush) in shape and enter a gap existing in the graphite as an anode active material. Thus, the anode active material layer excellent in ion conductivity may be obtained.

Examples of the sulfide solid electrolyte in the embodiment include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ ("m" and "n" are positive numbers; Z is any of Ge, Zn and Ga; for example, $Li_{3.25}P_{0.25}Ge_{0.76}S_4$), $Li_2$—$GeS_2$, $Li_2S$—$SiS_2$—$Li_3PO_4$, and $Li_2S$—$SiS_2$—$Li_xMO_y$ ("x" and "y" are positive numbers; M is any of P, Si, Ge, B, Al, Ga and In). Above all, $Li_2S$—$P_2S_5$ may be appropriately used. Incidentally, the description of the "$Li_2S$—$P_2S_5$" refers to the sulfide solid electrolyte obtained by using a raw material composition containing $Li_2S$ and $P_2S_5$, and the same is applied to other descriptions.

Also, in the case where the sulfide solid electrolyte is obtained by using a raw material composition containing $Li_2S$ and $P_2S_5$, the ratio of $Li_2S$ to the total of $Li_2S$ and $P_2S_5$ is, for example, preferably within a range of 70 mol % to 80 mol %, more preferably within a range of 72 mol % to 78 mol %, and far more preferably within a range of 74 mol % to 76 mol %. The reason therefor is that this allows the sulfide solid electrolyte having an ortho-composition or a composition in the neighborhood of it and allows the sulfide solid electrolyte with high chemical stability. Here, ortho generally means oxo acid which is the highest in degree of hydration among oxo acids obtained by hydrating the same oxide. In the present invention, a crystal composition to which the greatest amount of $Li_2S$ is added among sulfides is called an ortho-composition. $Li_3PS_4$ corresponds to the ortho-composition in the $Li_2S$—$P_2S_5$ system. In the case of an $Li_2S$—$P_2S_5$-based sulfide solid electrolyte, the ratio of $Li_2S$ and $P_2S_5$ such as to allow the ortho-composition is $Li_2S:P_2S_5=75:25$ on a molar basis. Incidentally, also in the case of using $Al_2S_3$ or $B_2S_3$ instead of $P_2S_5$ in the sulfide solid electrolyte, the preferable range is the same. $Li_3AlS_3$ corresponds to the ortho-composition in the $Li_2S$—$Al_2S_3$ system and $Li_3BS_3$ corresponds to the ortho-composition in the $Li_2S$—$B_2S_3$ system.

Also, in the case where the sulfide solid electrolyte is obtained by using a raw material composition containing $Li_2S$ and $SiS_2$, the ratio of $Li_2S$ to the total of $Li_2S$ and $SiS_2$ is, for example, preferably within a range of 60 mol % to 72 mol %, more preferably within a range of 62 mol % to 70 mol %, and far more preferably within a range of 64 mol % to 68 mol %. The reason therefor is that this allows the sulfide solid electrolyte having an ortho-composition or a composition in the neighborhood of it and allows the sulfide solid electrolyte with high chemical stability. $Li_4SiS_4$ corresponds to the ortho-composition in the $Li_2S$—$SiS_2$ system. In the case of an $Li_2S$—$SiS_2$-based sulfide solid electrolyte, the ratio of $Li_2S$ and $SiS_2$ such as to allow the ortho-composition is $Li_2S:SiS_2=66.7:33.3$ on a molar basis. Incidentally, also in the case of using $GeS_2$ instead of $SiS_2$ in the sulfide solid electrolyte, the preferable range is the same. $Li_4GeS_4$ corresponds to the ortho-composition in the $Li_2S$—$GeS_2$ system.

Also, in the case where the sulfide solid electrolyte is obtained by using LiX (X=Cl, Br and I), the ratio of LiX is, for example, preferably within a range of 1 mol % to 60 mol %, more preferably within a range of 5 mol % to 50 mol %, and far more preferably within a range of 10 mol % to 40 mol %. Also, in the case where the sulfide solid electrolyte is obtained by using $Li_2O$, the ratio of $Li_2O$ is, for example, preferably within a range of 1 mol % to 25 mol %, more preferably within a range of 3 mol % to 15 mol %.

The sulfide solid electrolyte in the present invention may be sulfide glass, or crystallized sulfide glass obtained by heat-treating the sulfide glass. The sulfide glass may be obtained by amorphization treatment such as a mechanical milling method and a melt extraction method. On the other hand, the crystallized sulfide glass may be obtained by heat-treating the sulfide glass, for example.

The content of the sulfide solid electrolyte in the anode active material layer is, for example, preferably within a range of 1% by weight to 90% by weight, more preferably within a range of 10% by weight to 80% by weight.

(iii) Anode Active Material Layer

The anode active material layer may further contain a conductive material and a binder as required. Examples of the conductive material include carbon black such as acetylene black and Ketjen Black, and carbon fiber. The addition of such a conductive material allows electron conduction of the anode active material layer to be improved. Also, examples of the binder include fluorine-containing binders such as PTFE and PVDF.

The voidage of the anode active material layer is not particularly limited if the voidage is such as to allow sufficient energy density, but is, for example, preferably the same range (specifically 30% or less) as the third embodiment and fourth embodiment described later. Incidentally, a calculation method for the voidage is described later. Also, the thickness of the anode active material layer may be properly determined in accordance with kinds of an intended all solid state battery, and is preferably, for example, within a range of 0.1 μm to 1000 μm, above all, within a range of 10 μm to 100 μm, further, within a range of 10 μm to 50 μm.

(2) Solid Electrolyte Layer

The solid electrolyte layer in the embodiment is a layer containing at least a solid electrolyte. Examples of the solid electrolyte used for the present invention include an oxide based solid electrolyte and a sulfide solid electrolyte, preferably a sulfide solid electrolyte among them. Incidentally, the same sulfide solid electrolyte as for the anode active material layer may be used. Also, a polymer electrolyte and a gel electrolyte except the oxide based solid electrolyte and sulfide solid electrolyte may be used as the solid electrolyte layer.

Examples of the polymer electrolyte include a polymer electrolyte containing a lithium salt and a polymer. The lithium salt is not particularly limited if the lithium salt is a lithium salt used for a general lithium battery, but examples thereof include $LiPF_6$, $LiBF_4$, $LiN(CF_3SO_2)_2$, $LiCF_3SO_3$, $LiC_4F_9SO_3$, $LiC(CF_3SO_2)_3$ and $LiClO_4$. The polymer is not particularly limited if the polymer is such as to form a complex with the lithium salt, but specific examples thereof include polyethylene oxide.

Examples of the gel electrolyte include a gel electrolyte containing a lithium salt, a polymer and a nonaqueous solvent. The same lithium salt as for the polymer electrolyte may be used. The nonaqueous solvent is not particularly limited if the nonaqueous solvent may dissolve the lithium salt, but examples thereof include propylene carbonate, ethylene carbonate, diethyl carbonate, dimethyl carbonate, ethyl methyl carbonate, 1,2-dimethoxyethane, 1,2-diethoxyethane, acetonitrile, propionitrile, tetrahydrofuran, 2-methyltetrahydrofuran, dioxane, 1,3-dioxolane, nitromethane, N,N-dimethylformamide, dimethyl sulfoxide, sulfolane and γ-butyrolactone. These nonaqueous solvents may be used by only one kind or by mixture of two kinds or more. Also, an ambient-temperature molten salt may be used as a nonaqueous liquid electrolyte. Also, the polymer is not particularly limited if the polymer may be gelatinized, but examples thereof include polyethylene oxide, polypropylene oxide, polyacrylonitrile, polyvinylidene fluoride (PVDF), polyurethane, polyacrylate and cellulose.

The content of the solid electrolyte in the solid electrolyte layer is preferably, for example, 60% by weight or more, above all, 70% by weight or more, and particularly, 80% by weight or more. The solid electrolyte layer may consist of only the solid electrolyte described above, or contain a binder. Incidentally, the same binder as for the anode active material layer may be used. Also, the thickness of the solid electrolyte layer may be properly determined in accordance with constitutions of an intended all solid state battery, and is preferably, for example, within a range of 0.1 μm to 1000 μm, above all, within a range of 0.1 μm to 300 μm.

(3) Cathode Active Material Layer

The cathode active material layer in the embodiment is a layer containing at least a cathode active material, and may further contain at least one of a solid electrolyte, a conductive material and a binder as required.

The cathode active material in the embodiment is properly selected in accordance with kinds of a conductive ion of an intended all solid state battery, and is not particularly limited if the cathode active material occludes and releases a conductive ion (such as Li ion). Also, the cathode active material may be an oxide cathode active material or a sulfide cathode active material.

Examples of the oxide active material used as the cathode active material include rock salt bed type active materials such as $LiCoO_2$, $LiMnO_2$, $LiNiO_2$, $LiVO_2$ and $LiNi_{1/3}Co_{1/3}Mn_{1/3}O_2$, spinel type active materials such as $LiMn_2O_4$ and $LiNi_{0.5}Mn_{1.5}O_4$, olivine type active materials such as $LiFePO_4$ and $LiMnPO_4$, and Si-containing active materials such as $Li_2FeSiO_4$ and $Li_2MnSiO_4$. Also, examples of the oxide active material except the above include $Li_4Ti_5O_{12}$. A coat layer for inhibiting a reaction with a sulfide solid electrolyte material is preferably formed on the surface of the oxide active material. The reason therefor is that this allows a high resistive layer to be inhibited from occurring by a reaction between the oxide active material and the sulfide solid electrolyte. Examples of a material for the coat layer include an oxide material having ion conductivity, and specific examples thereof include lithium niobate. Also, examples of the sulfide active material used as the cathode active material include copper Chevrel ($Cu_2Mo_6S_8$), iron sulfide (FeS), cobalt sulfide (CoS) and nickel sulfide (NiS).

Examples of the shape of the cathode active material include a particulate shape. The average particle diameter of the cathode active material is preferably, for example, within a range of 0.1 μm to 50 μm, above all, within a range of 1 μm to 50 μm, and within a range of 1 μm to 20 μm, further, within a range of 3 μm to 5 μm. Incidentally, the average particle diameter may be measured with observation by a scanning electron microscope (SEM), for example. Also, the content of the cathode active material in the cathode active material layer is, for example, preferably within a range of 10% by weight to 99% by weight, more preferably within a range of 20% by weight to 90% by weight.

The cathode active material layer preferably contains the solid electrolyte further. The reason therefor is that this allows ion conductivity in the cathode active material layer to be improved. Incidentally, the same solid electrolyte contained in the cathode active material layer as for the anode active material layer may be used. The content of the solid electrolyte in the cathode active material layer is, for example, preferably within a range of 1% by weight to 90% by weight, more preferably within a range of 10% by weight to 80% by weight.

The cathode active material layer may contain a conductive material and a binder as required. Incidentally, the same conductive material and binder as for the anode active material layer may be used. Also, the thickness of the cathode active material layer may be properly determined in accordance with kinds of an intended all solid state battery, and is preferably, for example, within a range of 0.1 μm to 1000 μm, above all, within a range of 10 μm to 100 μm, further, within a range of 10 μm to 50 μm.

(4) Battery Element

The battery element in the embodiment has the cathode active material layer, the anode active material layer and the solid electrolyte layer, and is confined at a confining pressure more than 75 kgf/cm$^2$. Thus, the battery element is confined at such a predetermined confining pressure as to allow expansion and contraction to be restrained. Therefore, even in the case of repeatedly performing charge and discharge, an all solid state battery with high durability may be obtained. The confining pressure in the embodiment is not particularly limited if the confining pressure is ordinarily more than 75 kgf/cm$^2$, but is, for example, preferably 150 kgf/cm$^2$ or more, more preferably 400 kgf/cm$^2$ or more. The case where the confining pressure is too smaller than the range causes the sulfide solid electrolyte in the anode active material layer to enter a gap in the graphite with difficulty, and brings a possibility of increasing a gap existing in the anode active material layer. Therefore, an ion conduction path and an electron conduction path are formed with difficulty to deteriorate battery performance. On the other hand, the confining pressure is, for example, preferably 1000 kgf/cm$^2$ or less, more preferably 500 kgf/cm$^2$ or less. The reason therefor is that the case where the confining pressure is too larger than the range causes the shape of the graphite as an anode active material to be retained with difficulty. Therefore, a function as the anode active material described above deteriorates and the performance of the anode active material layer lowers. Also, the reason therefor is that space and weight of a constraint member for confining the battery element increase to bring a possibility of saving space with difficulty.

The battery element ordinarily has a cathode current collector for collecting the cathode active material layer and an anode current collector for collecting the anode active material layer in addition to the cathode active material layer described above and the like. Examples of a material for the cathode current collector include SUS, aluminum, nickel, iron, titanium and carbon. Also, examples of a material for the anode current collector include SUS, copper, nickel and carbon. Also, factors such as the thickness and shape of the cathode current collector and the anode current collector are preferably selected properly in accordance with uses of all the solid state battery and the like. Also, a general battery case may be used for a battery case to be used for the embodiment, and examples thereof include a battery case made of SUS.

(5) All Solid State Battery

The all solid state battery of the embodiment may have a constitution except the battery element, and examples thereof include a member for applying confining pressure to the battery element (a constraint member). Such a constraint member is not particularly limited if the constraint member allows a desired confining pressure to the battery element. Above all, the constraint member is preferably a member for uniformly applying confining pressure to the whole surface of the battery element. Specific examples of such a constraint member include a member having at least a support plate. Also, a material for the constraint member is not particularly limited if the material is a material endurable against a predetermined pressure, but examples thereof include metal, resin and rubber.

Examples of kinds of the all solid state battery of the embodiment include an all solid lithium battery, an all solid sodium battery, an all solid magnesium battery and an all solid calcium battery; above all, preferably an all solid lithium battery. Also, the all solid state battery in the embodiment may be a primary battery or a secondary battery, preferably a secondary battery among them. The reason therefor is that it may be repeatedly charged and discharged and be useful as a car-mounted battery, for example. Incidentally, the primary battery means a battery available as a primary battery, that is, a battery which is first charged sufficiently and thereafter discharged. Also, examples of the shape of the all solid state battery of the embodiment include a coin shape, a laminate shape, a cylindrical shape and a rectangular shape. A method for producing the all solid state battery of the embodiment is not particularly limited if the method allows the all solid state battery described above.

2. Second Embodiment

The all solid state battery of a second embodiment is an all solid state battery comprising a battery element having a cathode active material layer, an anode active material layer, and a solid electrolyte layer formed between the cathode active material layer and the anode active material layer, characterized in that the anode active material layer contains graphite as an anode active material and a sulfide solid electrolyte, the graphite has an $I_{002}/I_{110}$ value of 200 or less after pressing at a pressure of 4.3 ton/cm$^2$ in the case of regarding X-ray diffraction intensity of a peak on (002) plane as $I_{002}$ and X-ray diffraction intensity of a peak on (110) plane as $I_{110}$, and the battery element is confined at a pressure more than 75 kgf/cm$^2$.

Figure 4:
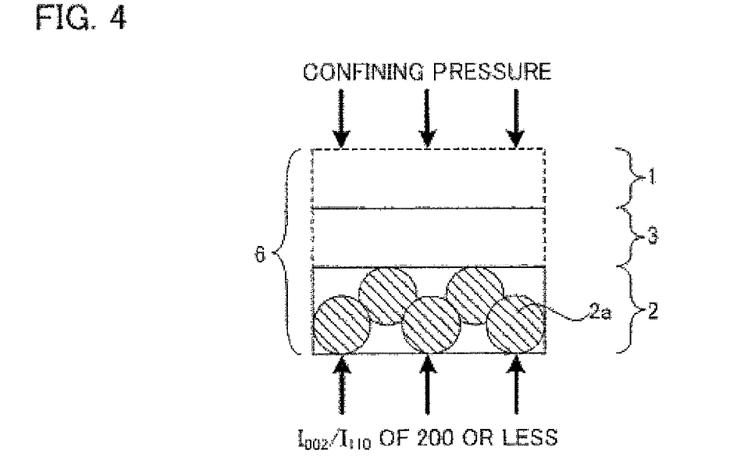
FIG. 4 is a schematic view explaining another example of an anode active material layer in the present invention.

FIG. 4 is a schematic view showing an example of an anode active material layer included in the all solid state battery of the embodiment. As shown in FIG. 4, the anode active material layer 2 contains graphite 2a as an anode active material and a sulfide solid electrolyte (not shown in the figure). The graphite 2a has an $I_{002}/I_{110}$ value of 200 or less after pressing at a pressure of 4.3 ton/cm$^2$ in the case of regarding X-ray diffraction intensity of a peak on (002) plane as $I_{002}$ and X-ray diffraction intensity of a peak on (110) plane as $I_{110}$. In addition, the battery element 6 is confined at a confining pressure more than 75 kgf/cm$^2$. Incidentally, reference numerals not described in FIG. 4 are the same as FIGS. 1 and 2; therefore, the description here is omitted.

According to the present invention, the $I_{002}/I_{110}$ value after pressing at a pressure of 4.3 ton/cm$^2$ is within a predetermined range and the battery element is confined at a predetermined confining pressure, so that input characteristics during high rate charging improve. Thus, an all solid state battery suitable for high rate charging may be obtained.

Thus, the reason why the $I_{002}/I_{110}$ value after pressing at a pressure of 4.3 ton/cm$^2$ is within a predetermined range and the battery element is confined at confining pressure and thereby input characteristics during high rate charging improve is guessed as follows. Here, (002) plane of the graphite corresponds to a basal plane and (110) plane corresponds to an edge plane. As described in the section "1. First embodiment", a conductive ion (such as Li ion) is inserted and desorbed on an edge plane, and a conductive ion is not inserted and desorbed on a basal plane. In the case where the $I_{002}/I_{110}$ value is not within a predetermined range, it is conceived that the ratio of the edge plane existing on the surface of the graphite is relatively low, and the ratio of the basal plane is relatively high. Accordingly, it is conceived that an ion conduction path and an electron conduction path are not secured, and a function as the active material is not sufficiently obtained. In contrast, in the embodiment, the $I_{002}/I_{110}$ value is within such a predetermined range that the relative ratio of the edge plane on the surface of the graphite is secured, and an ion conduction path and an electron conduction path are secured. In addition, in the embodiment, it is conceived that the battery element is confined at such a predetermined confining pressure that a sulfide solid electrolyte is crushed so moderately as to easily enter a gap in the graphite. Thus, an anode active material layer more excellent in ion conductivity may be obtained. Accordingly, input characteristics during high rate charging improve and an all solid state battery suitable for high rate charging may be obtained.

The anode active material layer in the embodiment is a layer containing graphite as an anode active material and a sulfide solid electrolyte. The graphite is not particularly limited if the $I_{002}/I_{110}$ value after pressing at a pressure of 4.3 ton/cm² is 200 or less, but the $I_{002}/I_{110}$ value is preferably a smaller value from the viewpoint of insertion and desorption of a conductive ion.

The $I_{002}/I_{110}$ value is ordinarily 200 or less, for example, preferably 100 or less, more preferably 50 or less. The reason therefor is that the case where the $I_{002}/I_{110}$ value is more than the range brings a possibility that the ratio of the edge plane involved in insertion and desorption of a conductive ion becomes relatively low on the surface of the graphite. Thus, an ion conduction path and an electron conduction path are secured with difficulty. Here, examples of a measuring method for the X-ray diffraction intensity include X-ray diffraction (XRD) measurement using CuKα ray. Specifically, the X-ray diffraction intensity may be obtained by measuring each of an intensity of a diffraction peak for indicating (002) plane, which appears in a position of a diffraction angle 2θ=26.5°±1.0°, and an intensity of a diffraction peak for indicating (110) plane, which appears in a position of a diffraction angle 2θ=77.5°±1.0° (particularly, 2θ=77.5°±0.03°). Incidentally, the $I_{002}/I_{110}$ value may be a value obtained by XRD measuring the anode active material layer containing the graphite as an anode active material and another constitution such as the sulfide solid electrolyte described later after pressing at a pressure of 4.3 ton/cm², or a value obtained by XRD measuring a laminated body, in which the anode active material layer, the solid electrolyte layer and the cathode active material layer described above are laminated, after pressing at a pressure of 4.3 ton/cm². The reason therefor is that the sulfide solid electrolyte contained in the anode active material layer is such a comparatively soft material that the $I_{002}/I_{110}$ value obtained by measuring the graphite after pressing at the pressure described above and the $I_{002}/I_{110}$ value obtained by measuring the anode active material layer after pressing at the pressure described above are approximate values.

Also, the graphite as an anode active material preferably has a hardness of 0.36 GPa or more, for example. As described in the section "1. First embodiment", it is conceived that the relative ratio between the edge plane and the basal plane on the surface of the graphite changes in accordance with shape change of the graphite. Thus, the graphite has such a predetermined hardness as to bring a high possibility that the shape of the graphite may be retained even though the battery element is confined at a predetermined confining pressure. Thus, the relative ratio of the edge plane existing on the surface of the graphite is maintained, and an ion conduction path and an electron conduction path are secured.

With regard to the anode active material layer in the embodiment, the voidage thereof is not particularly limited if the voidage is such as to secure an ion conduction path and an electron conduction path, but is, for example, preferably the same range (specifically 30% or less) as the third embodiment and fourth embodiment described later. Incidentally, a calculation method for the voidage is described later.

The material and shape of an anode active material in the embodiment, or another constitution of the anode active material layer in the embodiment are the same as that in the section "1. First embodiment".

The battery element in the embodiment has the cathode active material layer, the anode active material layer and the solid electrolyte layer, and is confined at a confining pressure more than 75 kgf/cm². Incidentally, the confining pressure is the same as defined in the first embodiment. Also, the cathode active material layer, the solid electrolyte layer, another constitution of the battery element, and another item of the all solid state battery in the embodiment are the same as those described in the section "1. First embodiment"; therefore, the description here is omitted.

3. Third Embodiment

The all solid state battery of a third embodiment is an all solid state battery comprising a battery element having a cathode active material layer, an anode active material layer, and a solid electrolyte layer formed between the cathode active material layer and the anode active material layer, characterized in that the anode active material layer contains graphite as an anode active material and a sulfide solid electrolyte, the graphite has a hardness of 0.36 GPa or more by a nanoindentation method, and a voidage of the anode active material layer is 30% or less.

Figure 5:
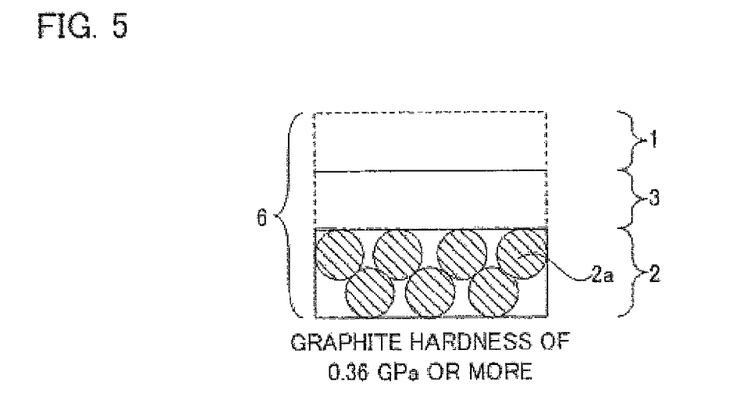
FIG. 5 is a schematic view explaining another example of an anode active material layer in the present invention.

FIG. 5 is a schematic view showing an example of an anode active material layer included in the all solid state battery of the embodiment. As shown in FIG. 5, the anode active material layer 2 contains graphite 2a as an anode active material and a sulfide solid electrolyte (not shown in the figure). With regard to the graphite 2a, a hardness calculated by a nanoindentation method is 0.36 GPa or more. Also, the voidage in the anode active material layer 2 is 30% or less. Incidentally, reference numerals not described in FIG. 5 are the same as FIGS. 1 and 2; therefore, the description here is omitted.

According to the present invention, the graphite as an anode active material has a predetermined hardness and the voidage of the anode active material layer is within a predetermined range, so that input characteristics during high rate charging improve. Thus, an all solid state battery suitable for high rate charging may be obtained.

Thus, the reason why the graphite has a predetermined hardness and the voidage of the anode active material layer is within a predetermined range and thereby input characteristics during high rate charging improve is guessed as follows. That is to say, in the anode active material layer, the voidage is preferably smaller from the viewpoint of improving ion conductivity of the solid electrolyte material contained in the anode active material layer. Also, in the case where the voidage of the anode active material layer is within a predetermined range, when the graphite as an anode active material does not have a predetermined hardness, there is a possibility that the shape of the graphite may not sufficiently be retained. Thus, as described in the section "1. First embodiment", the ratio of the edge plane existing on the surface of the graphite decreases relatively, and the ratio of the basal plane increases relatively. Accordingly, it is conceived that an ion conduction path and an electron conduction path are not secured, and a function of the graphite as the active material deteriorates. In contrast, in the embodiment, the graphite has such a sufficient hardness that the shape of the graphite may be sufficiently retained in the case where the voidage of the anode active material layer is within a predetermined range. Thus, it is conceived that the ratio of the edge plane existing on the surface of the graphite is maintained and an ion conduction path is secured. Accordingly, input characteristics during high rate charging improve and an all solid state battery suitable for high rate charging may be obtained.

The anode active material layer in the embodiment is a layer containing the graphite as an anode active material and the sulfide solid electrolyte, and having a voidage of 30% or less. Also, with regard to the graphite, a hardness calculated by a nanoindentation method is 0.36 GPa or more. Here, the graphite, the sulfide solid electrolyte, or another constitution of the anode active material layer may be the same as in the section "1. First embodiment".

The voidage in the anode active material layer is not particularly limited if the voidage is ordinarily 30% or less. Here, the "voidage" means the voidage of the anode active material layer in the obtained battery element, which is produced so as to include a cathode active material layer, a solid electrolyte layer, and an anode active material layer. The voidage is preferably 15% or less, for example. The reason therefor is that the case where the voidage is more than the range brings a possibility of lowering energy density in the anode active material layer. Thus, battery characteristics deteriorate. Here, examples of a calculation method for the voidage include a method for calculating by using the following expression.

voidage (%)=100−filling factor (%)=100−(volume of anode active material layer calculated from true density)/(volume of real anode active material layer)

Incidentally, "volume of anode active material layer calculated from true density" in the expression means the total of volumes obtained by dividing the weight of each material (such as anode active material and sulfide solid electrolyte) contained in the anode active material layer by the true density of each material, and "volume of real anode active material layer" means volumes calculated from sizes of the real anode active material layer.

The battery element in the embodiment is not particularly limited if the battery element is such as to contain the anode active material layer described above, but is preferably confined at a predetermined confining pressure, for example. The confining pressure is properly determined in accordance with the voidage of the intended anode active material layer, and is, for example, preferably in the same range (specifically 75 kgf/cm² or more) as the first embodiment and second embodiment described above. Also, another constitution of the battery element and another item of the all solid state battery in the embodiment are the same as those described in the section "1. First embodiment"; therefore, the description here is omitted.

4. Fourth Embodiment

The all solid state battery of a fourth embodiment is an all solid state battery comprising a battery element having a cathode active material layer, an anode active material layer, and a solid electrolyte layer formed between the cathode active material layer and the anode active material layer, characterized in that the anode active material layer contains graphite as an anode active material and a sulfide solid electrolyte, the graphite has an $I_{002}/I_{110}$ value of 200 or less after pressing at a pressure of 4.3 ton/cm² in the case of regarding X-ray diffraction intensity of a peak on (002) plane as $I_{002}$ and X-ray diffraction intensity of a peak on (110) plane as $I_{110}$, and a voidage of the anode active material layer is 30% or less.

Figure 6:
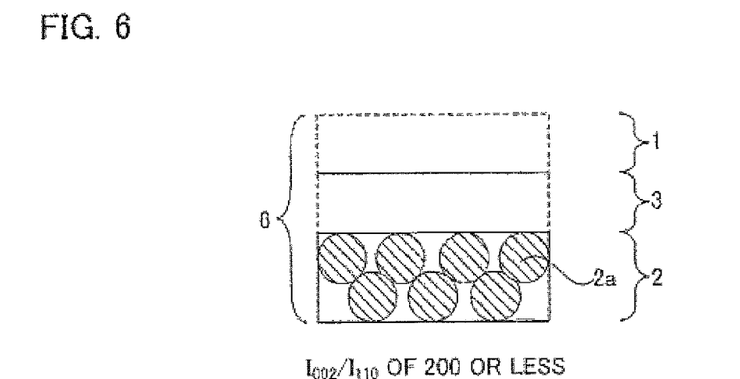
FIG. 6 is a schematic view explaining another example of an anode active material layer in the present invention.

FIG. 6 is a schematic view showing an example of an anode active material layer included in the all solid state battery of the embodiment. As shown in FIG. 6, the anode active material layer 2 contains graphite 2a as an anode active material and a sulfide solid electrolyte (not shown in the figure). The graphite 2a has an $I_{002}/I_{110}$ value of 200 or less in the case of regarding X-ray diffraction intensity of a peak on (002) plane as $I_{002}$ and X-ray diffraction intensity of a peak on (110) plane as $I_{110}$. Also, the voidage of the anode active material layer 2 in the battery element 6 is 30% or less. Incidentally, reference numerals not described in FIG. 6 are the same as FIGS. 1 and 2; therefore, the description here is omitted.

According to the present invention, the $I_{002}/I_{110}$ value after pressing at a pressure of 4.3 ton/cm² is within a predetermined range and the voidage of the anode active material layer is within a predetermined range, so that input characteristics during high rate charging improve and an all solid state battery suitable for high rate charging may be obtained.

Thus, the reason why the $I_{002}/I_{110}$ value after pressing at a pressure of 4.3 ton/cm² is within a predetermined range and the voidage of the anode active material layer is within a predetermined range and thereby input characteristics during high rate charging improve is guessed as follows. That is to say, as described in the section "2. Second embodiment", a conductive ion (such as Li ion) is inserted and desorbed on an edge plane (corresponding to (110) plane of the graphite), and a conductive ion is not inserted and desorbed on a basal plane (corresponding to (002) plane of the graphite). Thus, in the case where the $I_{002}/I_{110}$ value is not within a predetermined range, it is conceived that the ratio of the edge plane existing on the surface of the graphite is relatively low, and the ratio of the basal plane is relatively high. Accordingly, it is conceived that an ion conduction path and an electron conduction path are not secured, and a function as the active material is not sufficiently obtained. Also, as described in the section "3. Third embodiment", the voidage in the anode active material layer is preferably smaller from the viewpoint of improving ion conductivity of the solid electrolyte material contained in the anode active material layer. Accordingly, input characteristics during high rate charging improve and an all solid state battery suitable for high rate charging may be obtained.

The anode active material layer in the embodiment is a layer containing the graphite as an anode active material and the sulfide solid electrolyte layer. Also, the graphite has the $I_{002}/I_{110}$ value of 200 or less. Such graphite may be the same as in the section "2. Second embodiment".

The anode active material layer is not particularly limited if the voidage is ordinarily 30% or less, but may be the same as in the section "3. Third embodiment".

Another constitution of the anode active material layer, another constitution of the battery element, and another item of the all solid state battery in the embodiment are the same as those described in the section "1. First embodiment"; therefore, the description here is omitted.

Incidentally, the present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

Synthesis of Sulfide Solid Electrolyte

First, lithium sulfide ($Li_2S$) and diphosphorus pentasulfide ($P_2S_5$) were used as a starting material. These powders were weighed in a glove box under an Ar atmosphere (dew-point temperature: −70° C.) so as to become a molar ratio of $Li_2S:P_2S_5$=70:30. Projected into a 45-ml zirconia pot was 1 g of this mixture, and zirconia ball (φ=10 mm, 10 pieces) was further projected thereinto to hermetically seal the pot completely (Ar atmosphere). This pot was mounted on a planetary ball milling machine (P7™ manufactured by FRITSCH JAPAN CO., LTD.) to perform mechanical milling for 20 hours at the number of soleplate revolutions of 370 rpm and then obtain sulfide glass. Thereafter, the obtained sulfide glass was heated in Ar and crystallized. The heating conditions were the conditions of heating from room temperature up to 260° C. at 10° C./minute to thereafter cool to room temperature. Thus, crystallized sulfide glass (sulfide solid electrolyte) having a composition of $70Li_2S\text{-}30P_2S_5$ was obtained.

(Production of Battery)

Slurry containing $LiNi_{1/3}Co_{1/3}Mn_{1/3}O_2$ (a cathode active material) coated with $LiNbO_3$ and the sulfide solid electrolyte described above at a volume ratio of 6:4 was coated on an aluminum foil (a cathode current collector) to obtain a cathode. Next, graphite (an anode active material) and the sulfide solid electrolyte described above were prepared into an anode mixture so as to be at a volume ratio of 6:4, and slurry containing the anode mixture was coated on a copper foil to obtain an anode. In addition, slurry containing the sulfide solid electrolyte described above was coated on an anode active material layer of the obtained anode to form a solid electrolyte layer. Next, the anode and the cathode were laminated so that the solid electrolyte layer formed on the anode and a cathode active material layer of the cathode contact, and pressed at a pressure of 4.3 ton/cm² to thereby obtain a battery element with the composition shown in FIG. 1. The obtained battery element was confined at a pressure of 450 kgf/cm². An evaluation battery was produced by using the obtained battery element. Incidentally, the voidage of the anode active material layer in the obtained evaluation battery was 9%.

Examples 2 to 4

An evaluation battery was obtained in the same manner as Example 1 except that the battery element was confined at a pressure of the value as shown in Table 1.

Comparative Example 1

An evaluation battery was obtained in the same manner as Example 1 except that graphite with a hardness of 0.35 GPa was used as the anode active material.

Comparative Examples 2 to 4

An evaluation battery was each obtained in the same manner as Comparative Example 1 except that the battery element was confined at a pressure of the value as shown in Table 1.

[Evaluations]

(Hardness Measurement of Graphite)

In Examples 1 to 4 and Comparative Examples 1 to 4, the graphite as an anode active material was embedded in resin and ground to measure the hardness of the graphite on a surface thereof twenty times by using a nanoindenter (manufactured by Agilent Technologies). The obtained numerical values were averaged and regarded as the hardness of the graphite. The results are shown in Table 1. Incidentally, the measurement conditions are an indentation depth of 500 nm and a measurement mode of CSM.

(X-Ray Diffraction Measurement)

In Examples 1 to 4 and Comparative Examples 1 to 4, the graphite used as an anode active material was prepared into powder. Put in a vessel of 1 cm² was 100 mg of the prepared anode mixture and pressed at a pressure of 4.3 ton/cm². The graphite after being pressed was subject to X-ray diffraction (XRD) measurement to obtain diffraction intensity ratio $I_{002}/I_{110}$. Incidentally, XRD measurement was performed under an inert atmosphere on the condition of using CuKα ray. Specifically, $I_{002}/I_{110}$ was calculated from an intensity of a diffraction peak for indicating (002) plane, which appears in a position of $2\theta=26.5°\pm1.0°$, and an intensity of a diffraction peak for indicating (110) plane, which appears in a position of $2\theta=77.5°\pm0.03°$. The results are described in Table 1.

(Measurement of Charging Capacity)

The evaluation battery each obtained in Examples 1 to 4 and Comparative Examples 1 to 4 was left at a temperature of 25° C. for 3 hours to thereafter perform charge and discharge at ⅓C rate. Thereafter, charge and discharge were performed at 1.5C rate to measure the capacity of the anode such as to allow ordinary charge with no descent of voltage. Incidentally, the "descent of voltage" means a descent of voltage by 0.2 mV or more in a short period. The results are shown in Table 1.

TABLE 1

| | Hardness (Gpa) | Diffraction Intensity Ratio ($I_{002}/I_{110}$) | Confining Pressure (kgf/cm²) | Voidage (%) | ⅓ C Charging Capacity (mAh/g) | 1.5 C Charging Capacity (mAh/g) |
|---|---|---|---|---|---|---|
| Example 1 | 0.64 | 25 | 450 | 9 | 202 | 120 |
| Example 2 | 0.64 | 25 | 150 | 15 | 157 | 80 |
| Example 3 | 0.64 | 25 | 75 | 18 | 141 | 40 |
| Example 4 | 0.64 | 25 | 15 | 22 | 126 | 12 |
| Comparative Example 1 | 0.35 | 246 | 450 | 8 | 197 | 97 |
| Comparative Example 2 | 0.35 | 246 | 150 | 12 | 138 | 73 |
| Comparative Example 3 | 0.35 | 246 | 75 | 13 | 117 | 51 |
| Comparative Example 4 | 0.35 | 246 | 15 | 15 | 105 | 32 |

Any of Examples 1 to 2 and Comparative Examples 1 to 2 is such that the battery element is confined at a pressure more than 75 kgf/cm². As shown in Table 1, in comparing Example 1 and Comparative Example 1 with a confining pressure of 450 kgf/cm², it may be confirmed that Example 1 exhibits higher charging capacity at both low rate (⅓C) and high rate (1.5C). Also, in comparing Example 2 and Comparative Example 2 with a confining pressure of 150 kgf/cm², it may be confirmed that Example 2 exhibits higher charging capacity at both low rate and high rate. Thus, in the case where the battery element is confined at a predetermined pressure, with regard to the graphite used as an anode active material, it may be confirmed that high charging capacity is obtained in high rate charging by determining a hardness calculated by a nanoindentation method at 0.64 GPa as a predetermined value (0.36 GPa) or more, or determining a diffraction intensity ratio $I_{002}/I_{100}$ value at 25 as less than a predetermined value (200).

Also, in Table 1, it may be confirmed that the voidages of the anode active material layer are identical in Example 2 and Comparative Example 4. In comparing Example 2 and Comparative Example 4, it may be confirmed that the charging capacity of Example 2 becomes higher at both low rate and high rate. Here, through the results of Table 1, in Examples 1 to 4 and Comparative Examples 1 to 4, the charging capacity at low rate and high rate tends to lower as the voidage becomes higher. Thus, in a range (such as 30% or less) of the voidage such as to include Examples 1 to 4 and Comparative Examples 1 to 4, in the evaluation batteries for which the voidages of the anode active material layer are at a similar level, with regard to the graphite used as an anode active material, it may be confirmed that high charging capacity is obtained in high rate charging by determining a hardness calculated by a nanoindentation method at 0.64 GPa as a predetermined value (0.36 GPa) or more, or determining a diffraction intensity ratio $I_{002}/I_{110}$ value at 25 as less than a predetermined value (200).

REFERENCE SIGNS LIST

1 . . . cathode active material layer
2 . . . anode active material layer
2a . . . graphite (anode active material)
3 . . . solid electrolyte layer
4 . . . cathode current collector
5 . . . anode current collector
6 . . . battery element
10 . . . all solid state battery

The invention claimed is:

1. An all solid state battery comprising a battery element having a cathode active material layer, an anode active material layer, and a solid electrolyte layer formed between the cathode active material layer and the anode active material layer, wherein
   the anode active material layer contains graphite as an anode active material and a sulfide solid electrolyte,
   the graphite has a hardness of 0.64 GPa or more by a nanoindentation method,
   the graphite has an $I_{002}/I_{110}$ value of 25 or less after pressing at a pressure of 4.3 ton/cm² in the case of regarding X-ray diffraction intensity of a peak on (002) plane as $I_{002}$ and X-ray diffraction intensity of a peak on (110) plane as $I_{110}$,
   a voidage of the anode active material layer is 15% or less, and
   the battery element is confined at a pressure 150 kgf/cm² or more.

* * * * *